United States Patent [19]
Colley

[11] 3,887,816
[45] June 3, 1975

[54] OPTICAL SYSTEM FOR X-RAY SCANNING EQUIPMENT
[75] Inventor: Austin G. Cooley, Reno, Nev.
[73] Assignee: Litton Medical Products, Inc., Elk Grove, Ill.
[22] Filed: Apr. 26, 1973
[21] Appl. No.: 354,671

[52] U.S. Cl.................................. 250/571; 356/203
[51] Int. Cl....................... G01n 21/06; G01n 21/22
[58] Field of Search.......... 250/219 Q, 219 FT, 571; 356/203

[56] References Cited
UNITED STATES PATENTS
| | | | |
|---|---|---|---|
| 2,602,861 | 7/1952 | Albersheim | 250/219 FT |
| 3,013,467 | 8/1973 | Minsky | 356/203 |
| 3,281,603 | 10/1966 | Goldmark | 250/219 Q |

Primary Examiner—James W. Lawrence
Assistant Examiner—T. N. Grigsby
Attorney, Agent, or Firm—Alan C. Rose; Robert M. Vargo; Alfred B. Levine

[57] ABSTRACT

An optical system is disclosed for X-ray film scanning equipment that functions to reduce the contrast between the scanning of light and dark areas of the film. The optical system comprises a fluorescent lamp having an elongated aperture or window for illuminating a thin line onto the film, which is spaced from the window face of the lamp. A movable mirror is positioned on the opposite side of the film to cause the scan to sweep from one end of the illuminated line on the film to the other. The scanned images are reflected on an objective lens which, in turn, focuses the images onto an aperture plate with the light passing through the aperture being received by a photosensitive device. A cylindrical lens is spaced from the light source in order to diverge the spectral light passing therethrough and to increase the luminance of the illuminated line. In this manner, the light signals received by the photosensitive device from the clear areas will be reduced, while the signals received from the dark areas will remain the same.

7 Claims, 4 Drawing Figures

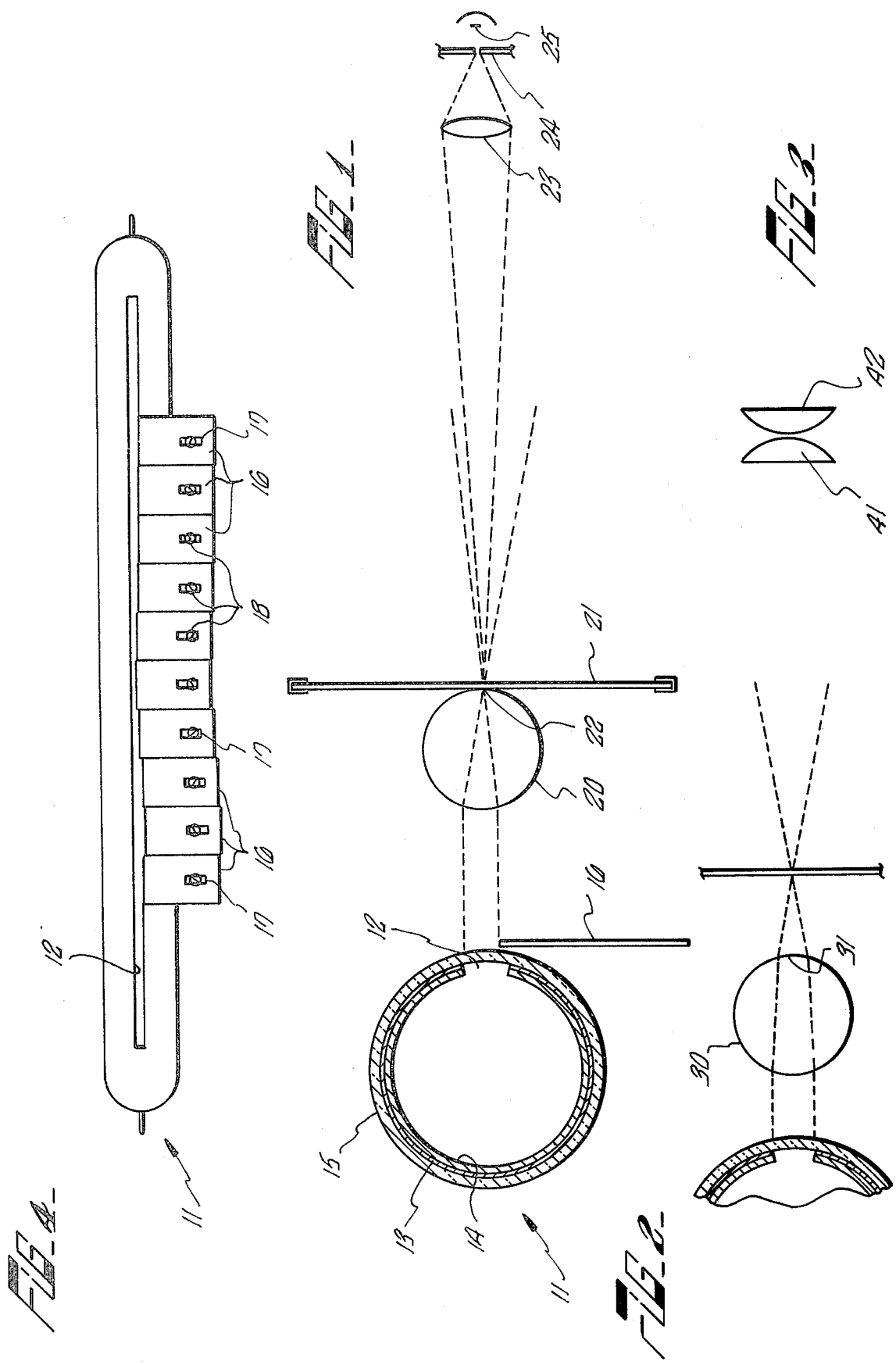

ial lens. A portion of these divergent rays will pass through an objective lens 23 which is positioned directly in front of an aperture plate 24. An oscillating or movable mirror (not shown) is positioned between the aperture 24 and the objective lens

OPTICAL SYSTEM FOR X-RAY SCANNING EQUIPMENT

BACKGROUND OF THE INVENTION

1. Field of the Invention

The present invention relates generally to X-ray scanning equipment and more particularly to optical systems for such equipment.

2. Description of the Prior Art

In X-ray scanning equipment, light is caused to pass through the scanned X-ray film to be picked up by a photosensitive device. The equipment operates on the theory that more light through the dense areas of the exposed film will be absorbed than that passing through the thin areas. As a result, the signals generated by the photosensitive pickup in response to the amount of light received will correlate to the light and dark areas of the film.

A problem with conventional optical systems for X-ray scanning equipment is that an additional factor is present that increases the normal light signal ratio between light and dark scanned areas. In other words, this factor increases the difference in the picked up signals between the light and dark areas of the scanned film over and above the normal difference due to absorption. The reason for this greater than normal difference in picked up signals between light and dark scanned areas is that the spectral light passing through the thin areas passes along a straight path to the objective lens that focuses the light to the photosensitive device, whereas the light through the dark area is diffused and spread out over a larger area. As a result, a higher than normal percentage of the light passing through thin areas reaches the photosensitive pickup device while a lower percentage of the light passing through the dark areas reaches the photosensitive device because of diffusion.

One proposal to reduce the light signal ratio between light and dark scanned areas would be to utilize a diffusion screen adjacent the film to be scanned. A diffusion screen is generally in the form of a ground glass or opal glass similar to the glass in a light bulb. The shortcoming with this proposal is that the diffusion screen would reduce the amount of light passed onto the photosensitive device from the dark areas as well as the light areas. Dark areas may pass only one thousandth of the light and a diffusion screen would take away much of this. As a result, the contrast would remain the same.

SUMMARY OF THE INVENTION

The present invention obviates the above-mentioned shortcomings by providing an optical system for X-ray film scanners that reduces the difference of light signals between the light and dark areas of the scanned film. In its broadest aspect, the invention resides in positioning a cylindrical lens in front of the film to be scanned a predetermined distance from the light source in order to diverge the spectral light passing therethrough. As a result, the phototube will receive much less of the spectral light when scanning the clear areas of the scanned film, while the signals from the dark areas thereof will remain the same.

Another advantage of the optical system of the present invention is that the transfer of light from the light source to the area of the film being scanned is greatly increased.

Another important advantage of the present invention is that the optical system smooths out the effect of the attenuating masks placed in front of the lamp illuminating the scanned subject.

The features of the present invention which are believed to be novel are set forth with particularity in the appended Claims. The present invention, both as to its organization and manner of operation, together with the further advantages thereof, may best be understood by reference to the following description, taken in connection with the accompanying drawings.

BRIEF DESCRIPTION OF THE DRAWINGS

FIG. 1 is a schematic view of the X-ray film scanner utilizing the optical system of the present invention;

FIG. 2 is a partial schematic view of the optical system of the present invention, showing the cylindrical lens positioned in a different location from that shown in FIG. 1;

FIG. 3 is a second embodiment of the condenser lens utilized in the optical system of the present invention; and FIG. 4 is a front elevational view of the fluorescent lamp showing the positioning of the attenuating masks.

DESCRIPTION OF THE PREFERRED EMBODIMENT

Referring now to the drawings, FIG. 1 illustrates an X-ray film scanner comprising a fluorescent lamp 11 having an elongated aperture or window 12 longitudinally formed thereon. The reflective coating 13 and the phosphor coating 14 extend around the interior of the glass bulb structure 15 except for the opening forming the window 12. The elongated window 12 is more clearly shown in FIG. 4. FIG. 4 also illustrates a plurality of attenuating masks 16 positioned adjacent the fluorescent lamp 11 along the length of the window 12. Each mask 16 includes a slot 17 for receiving a clamping screw 18 to enable each mask 16 to be adjustably movable across the front of the window 12 to partially mask off the light exiting therefrom. The reason that the attenuating masks 16 are used is that the light along the length of the fluorescent tube is not uniform but generally tapers off toward the end of the scanned line even though the ends of the bulb 11 extend beyond the scanned line by 1 or 2 inches. The characteristics of the optical scanning system favor the light from the center of the lamp 11. It is therefore preferable to partially mask off the center area of the lamp 11 and make discrete adjustments to take care of other variations in brightness along the window 12. Since the masks 16 are in the form of short sections which create steps between adjacent sections, the lamp 11 is spaced a predetermined distance from the line to be scanned to enable the steps of the mask to blend in the illumination of the scanned line so as not to have a noticeable effect.

A cylindrical lens 20 is positioned in front of the film 21 to be scanned. The cylindrical lens 20 is spaced from the light source 11 at a predetermined distance to focus the image of the window 12 onto the second surface 22 of the lens 20. The light rays that pass through this second surface 22 diverge at the angle of the rays passing through the cylindrical lens. A portion of these divergent rays will pass through an objective lens 23 which is positioned directly in front of an aperture plate 24. An oscillating or movable mirror (not shown) is positioned between the aperture 24 and the objective lens 23 to continuously sweep and reflect sequential portions of each scanned line onto the aperture plate 24. A typical oscillating mirror is shown in Assignee's copending U.S. Pat. applications, Ser. No. 344,284, filed Mar. 23, 1973 and now abandoned and Ser. No. 357,495 filed May 4, 1973. Normally, the movable mirror reflects the light beam approximately 90° and the objective lens 23 and aperture 24 would be positioned 90° from that shown in FIG. 1. However, for simplicity and because the movable mirror is conventional, the mirror is not shown and the lens 23 and plate 24 are shown in a straight path with respect to the light emanating from the lamp 11.

A photosensitive pickup device 25 is positioned behind the aperture plate 24 to receive the light signals passing therethrough and to generate electrical signals in response thereto.

As stated previously, the spectral light passing through clear areas of the scanned film passes along a straight line to the objective lens while the light passing through the dark areas is diffused and spread over a large area. In accordance with the present invention, the cylindrical lens 20 functions to diverge the rays passing therethrough to spread the rays almost as if they were spread by a diffusion plate. In this manner, the phototube 25 will receive much less of the spectral light when scanning clear film. Since there is practically no spectral light in scanning dark areas (the light is already being diffused as it emerges from the film) the divergence caused by the cylindrical lens 20 will have little or no effect on the light coming from the dark areas of the scanned film. As a result, the signals from the clear areas are less than with the conventional system, while the signals from the dark areas remain the same. In the conventional systems, the ratio of light between the light areas and the dark may be on the order of 250 to 1, while with the optical system of the present invention, the radio would be 100 to 1.

Besides reducing the effect of spectral light in the thin areas, the optical system utilizing the cylindrical lens 20 provides a higher illumination to equally raise the level of dark and light signals. Therefore, not only is the contrast between light and dark film areas reduced, but the luminance of the illuminated line is greatly improved.

The embodiment shown in FIG. 2 is similar to the system shown in FIG. 1, with the exception that a cylindrical lens 30 is spaced from the X-ray film 21 to enable the second surface 31 to bend the rays to image the window 12 at a distance from the lens 20.

In place of the cylindrical lens, a section or two sections 41 and 42 of the lens may be employed as shown in FIG. 3. This arrangement is used for the purpose of correcting spherical aberration.

As can be seen, the optical system of the present invention reduces the effect of spectral light in the thin areas while providing higher illumination along the scanned line.

It should be noted that various modifications can be made to the apparatus while still remaining within the purview of the following Claims.

What is claimed is:

1. In combination:
    an x-ray film station having a plane for receiving a frame of x-ray film;
    an exciter lamp positioned on one side of said x-ray film station for illuminating a thin line of illumination across the x-ray film;
    an aperture plate positioned on the opposite side of said film station;
    an objective lens positioned between said film station and aperture plate for focusing the scanned image from said film station onto said aperture plate;
    photosensitive means positioned behind said aperture plate for receiving the light signals passing through said aperture plate and generating electrical signals in response thereto;
    lens means positioned between said exciter lamp and said film station for diverging the spectral light passing therethrough and increasing the luminance of the illuminated line passing therethrough, said lens means including a cylindrical lens longitudinally positioned adjacent said film station; and
    means for attenuating portions of the illuminated line exiting said exciter lamp.

2. The combination of claim 1 wherein said cylindrical lens is of a strength to focus the illuminated line onto the plane of said film station.

3. The combination of claim 2 wherein said cylindrical lens is spaced from said film station.

4. The combination of claim 3 wherein said cylindrical lens is of a strength to focus the image of the illuminated line onto the surface of the plane of said film station.

5. In combination:
    an x-ray film station having a plane for receiving a frame of x-ray film;
    an exciter lamp positioned on one side of said x-ray film station for illuminating a thin line of illumination across the x-ray film;
    an aperture plate positioned on the opposite side of said film station;
    an objective lens positioned between said film station and aperture plate for focusing the scanned image from said film station onto said aperture plate;
    photosensitive means positioned behind said aperture plate for receiving the light signals passing through said aperture plate and generating electrical signals in response thereto;
    lens means positioned between said exciter lamp and said film station for diverging the spectral light passing therethrough; and
    means for attenuating portions of the illuminated line exiting said exciter lamp.

6. The combination of claim 5 wherein said attenuating means includes a plurality of movable masks positioned adjacent said exciter lamp adjacent the light path of said illuminated line.

7. The combination of claim 5 wherein said exciter lamp and movable masks are spaced a predetermined distance from said film station to enable the steps of the masks to be blended in the illumination of the scanned line so as to have no noticeable effect.

* * * * *